(12) United States Patent
Yamaura et al.

(10) Patent No.: US 11,194,535 B2
(45) Date of Patent: Dec. 7, 2021

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventors: Yusuke Yamaura, Kanagawa (JP); Seiya Inagi, Kanagawa (JP); Kazunari Hashimoto, Kanagawa (JP); Hidetaka Izumo, Kanagawa (JP); Tadaaki Sato, Kanagawa (JP); Teppei Aoki, Kanagawa (JP); Daisuke Yasuoka, Kanagawa (JP); Hiroshi Umemoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 159 days.

(21) Appl. No.: 16/136,292

(22) Filed: Sep. 20, 2018

(65) Prior Publication Data

US 2019/0095164 A1 Mar. 28, 2019

(30) Foreign Application Priority Data

Sep. 27, 2017 (JP) .............................. JP2017-186766

(51) Int. Cl.
*G06F 3/14* (2006.01)
*G10L 15/26* (2006.01)
(Continued)

(52) U.S. Cl.
CPC ......... *G06F 3/1423* (2013.01); *G02B 27/017* (2013.01); *G06F 3/011* (2013.01);
(Continued)

(58) Field of Classification Search
CPC ............ C07K 14/21; G02B 2027/0138; G02B 2027/014; G02B 27/017; G06F 3/011;
(Continued)

(56) References Cited

U.S. PATENT DOCUMENTS 5,642,518 A * 6/1997 Kiyama ................ G06F 16/345
704/7
9,992,451 B2 6/2018 Ono et al.
(Continued)

FOREIGN PATENT DOCUMENTS

JP 2002-344915 11/2002
JP 2005-197867 7/2005
(Continued)

OTHER PUBLICATIONS

"Office Action of Japan Counterpart Application", dated Jul. 20, 2021, with English translation thereof, p. 1-p. 8.

*Primary Examiner* — Sing-Wai Wu
(74) *Attorney, Agent, or Firm* — JCIPRNET

(57) ABSTRACT

An information processing apparatus includes a generation unit and an instruction unit. The generation unit generates a display image including information on speech or action of a target person, based on history information that the target person has made speech or action. The instruction unit instructs a display device, which displays an image of a virtual space so as to be superimposed in a real space, to display the generated display image as the image of the virtual space.

14 Claims, 19 Drawing Sheets

(51) Int. Cl.

| | | |
|---|---|---|
| *G02B 27/01* | (2006.01) | |
| *G06F 3/01* | (2006.01) | |
| *G06T 11/00* | (2006.01) | |
| *G10L 15/22* | (2006.01) | |
| *G06K 9/00* | (2006.01) | |
| *G06F 3/16* | (2006.01) | |

(52) U.S. Cl.
CPC .............. *G06T 11/00* (2013.01); *G10L 15/22* (2013.01); *G10L 15/26* (2013.01); *G02B 2027/014* (2013.01); *G02B 2027/0138* (2013.01); *G06F 3/013* (2013.01); *G06F 3/017* (2013.01); *G06F 3/167* (2013.01); *G06K 9/00288* (2013.01); *G09G 2352/00* (2013.01); *G09G 2358/00* (2013.01); *G09G 2370/022* (2013.01); *G09G 2370/042* (2013.01); *G09G 2370/16* (2013.01); *G10L 2015/223* (2013.01)

(58) Field of Classification Search
CPC ........ G06F 3/013; G06F 3/017; G06F 3/1423; G06F 3/167; G06K 9/00288; G06T 11/00; G09G 2352/00; G09G 2358/00; G09G 2370/022; G09G 2370/042; G09G 2370/16; G10L 15/22; G10L 15/26; G10L 2015/223

See application file for complete search history.

(56) References Cited

U.S. PATENT DOCUMENTS

| | | | |
|---|---|---|---|
| 2007/0124682 | A1 | 5/2007 | Fukeda et al. |
| 2008/0255847 | A1 | 10/2008 | Moriwaki et al. |
| 2013/0070973 | A1* | 3/2013 | Saito ................. G06K 9/00228 382/118 |
| 2014/0160157 | A1 | 6/2014 | Poulos et al. |
| 2015/0003680 | A1* | 1/2015 | Umeda .............. G06K 9/00677 382/103 |
| 2018/0047395 | A1* | 2/2018 | Sommers ................ G06F 40/58 |

FOREIGN PATENT DOCUMENTS

| | | |
|---|---|---|
| JP | 2007043493 | 2/2007 |
| JP | 2008-262046 | 10/2008 |
| JP | 2009194857 | 8/2009 |
| JP | 2016-506565 | 3/2016 |
| WO | 2015125375 | 8/2015 |

\* cited by examiner

FIG. 4

| USER ID | USER NAME | BELONGING DEPARTMENT | USER TYPE | LENGTH OF SERVICE | FACE FEATURE INFORMATION |
|---|---|---|---|---|---|
| user001 | A | SALES | REGULAR EMPLOYEE (MANAGEMENT POSITION) | 15 | ... |
| user002 | B | INTELLECTUAL PROPERTY | REGULAR EMPLOYEE (GENERAL POSITION) | 5 | ... |
| user003 | C | TECHNOLOGY | DISPATCH | 3 | ... |
| ... | ... | ... | ... | ... | ... |

CONFERENCE ID: C001, USER ID: user10

312

| USER ID | SPEECH TIMING | SPEECH TIME | SPEECH CONTENT | POSITION INFORMATION |
|---|---|---|---|---|
| user001 | 5/13/2017 14:25 | 15 SECONDS | I ALSO THINK SO ... | $(x_i, y_i)$ |
| ... | ... | ... | ... | ... |

FIG. 14

| CONVERSATION GROUP ID | USER NAME | SPEECH TIMING | SPEECH TIME | SPEECH CONTENT | POSITION INFORMATION |
|---|---|---|---|---|---|
| G001 | user001 | 5/13/2017 14:25 | 15 SECONDS | ... | $(x_1, y_1)$ |
| G001 | user002 | 5/13/2017 14:26 | 5 SECONDS | ... | $(x_2, y_2)$ |
| ... | ... | ... | ... | ... | ... |

| USER NAME | WEATHER | ○ COMPANY PROJECT | DELIVERY TIME OF ☐ WORK | PATENT OF △ |
|---|---|---|---|---|
| A | 1 | 5 | 0 | 2 |
| B | 1 | 5 | 3 | 2 |
| C | 1 | 3 | 0 | 3 |
| D | 1 | 1 | 1 | 1 |
| E | 1 | 0 | 0 | 0 |

_US 11,194,535 B2_

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-186766 filed Sep. 27, 2017.

BACKGROUND

Technical Field

The present invention relates to an information processing apparatus, an information processing system, and a non-transitory computer readable medium storing a program.

SUMMARY

According to an aspect of the invention, there is provided an information processing apparatus including a generation unit that generates a display image including information on speech or action of a target person, based on history information that the target person has made speech or action; and an instruction unit that instructs a display device, which displays an image of a virtual space so as to be superimposed in a real space, to display the generated display image as the image of the virtual space.

BRIEF DESCRIPTION OF THE DRAWINGS

Exemplary embodiment(s) of the present invention will be described in detail based on the following figures, wherein:

FIG. 4 is a diagram showing an example of a user attribute table;

FIG. 5 is a diagram showing an example of a conversation history table;

FIG. 14 is a diagram showing an example of a conversation history table;

FIG. 15 is a diagram showing an example of a recommended topic table;

DETAILED DESCRIPTION

Hereinafter, an exemplary embodiment of the present invention will be described in detail with reference to the accompanying drawings.

Summary of Exemplary Embodiment

An information processing apparatus according to the present exemplary embodiment includes a generation unit that generates a display image including information on a speech of a target person based on history information that the target person has made speech or action; and an instruction unit that instructs a display device that displays an image of a virtual space so as to be superimposed on a real space to display the generated display image as the image of the virtual space.

The "display device" includes a head mounted display device of a light transmission type which is worn on the head of the user and allows the user to view the display image as the image of the virtual space and at the same time directly view the real space (outside scene), a portable information terminal which displays a display image as an image of a virtual space so as to be superimposed on an image obtained by capturing an outside scene, and the like. The head mounted display device of a light transmission type may be a goggle type or an eyeglass type. The portable information terminal may be a head mounted type.

First Exemplary Embodiment

Figure 1A:
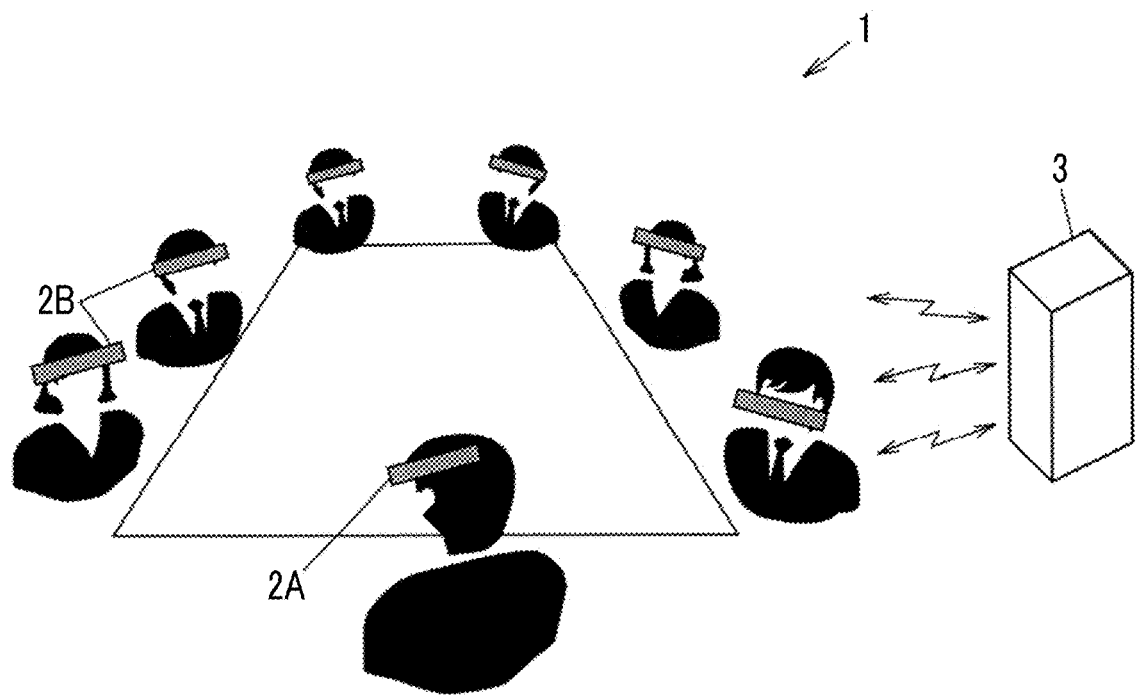
FIG. 1A is a diagram showing a configuration example of an information processing system according to a first exemplary embodiment of the present invention.
Figure 1B:
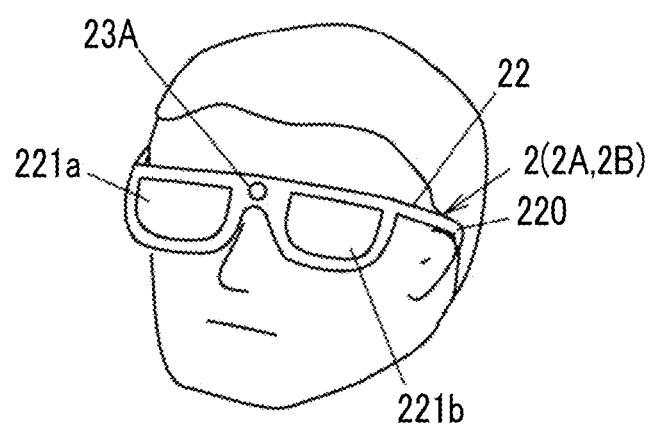
FIG. 1B is an external view showing an example of a head mounted display device.

FIG. 1A is a diagram showing a configuration example of an information processing system according to a first exemplary embodiment of the present invention, and FIG. 1B is an external view showing an example of a head mounted display device.

The information processing system 1 includes a head mounted display device (hereinafter referred to as "HMD device") 2A used by a first person, an HMD device 2B used by a second person, and an information processing apparatus that controls each of the HMD devices 2A and 2B (hereinafter collectively referred to as "HMD device 2"). The HMD device 2 and the information processing apparatus 3 are connected to each other so as to communicate with each other wirelessly. The HMD device 2A used by the first person is an example of a first display device. The HMD device 2B used by the second person is an example of a second display device. The second person an example of a target person.

In the case of the present exemplary embodiment, such an information processing system 1 can be used in, for example, a conference room of an office, a public facility, a hospital, or the like, a multipurpose room, a common room, a lecture hall, and the like. In the present exemplary embodiment, the first person is, for example, a facilitator having the role of a moderator in the conference (generally one person per conference) and the second person is, for example, a participant in the conference (generally, plural persons). The conference is an example of an event. The facilitators and participants are also collectively referred to as users hereinafter.

The HMD device 2 displays an image of a virtual space (hereinafter also referred to as "virtual image") so as to be superimposed on a real space, that is, virtually displays a virtual image. Specifically, as shown in FIG. 1B, the HMD device 2 is a head mounted display device of a light transmission type which is worn on the head of the user and allows the user to view a virtual image and at the same time directly view the real space (outside scene).

The HMD device 2 includes a display unit 22 and an outward-facing camera 23A. The display unit 22 includes a frame 220 to be worn on the ear, a right transmissive display 221*a*, and a left transmissive display 221*b* (collectively referred to as "transmissive display 221").

For the transmissive display 221, for example, a transmissive liquid crystal display, a transmissive organic EL display, a transmissive inorganic EL display, or the like can be used. The right transmissive display 221*a* displays the display image for the right eye and the left transmissive display 221*b* displays the display image for the left eye. The display image for the right eye and the display image for the left eye are superimposed on the outside scene and are viewed by the user as a virtual image.

Figure 2:
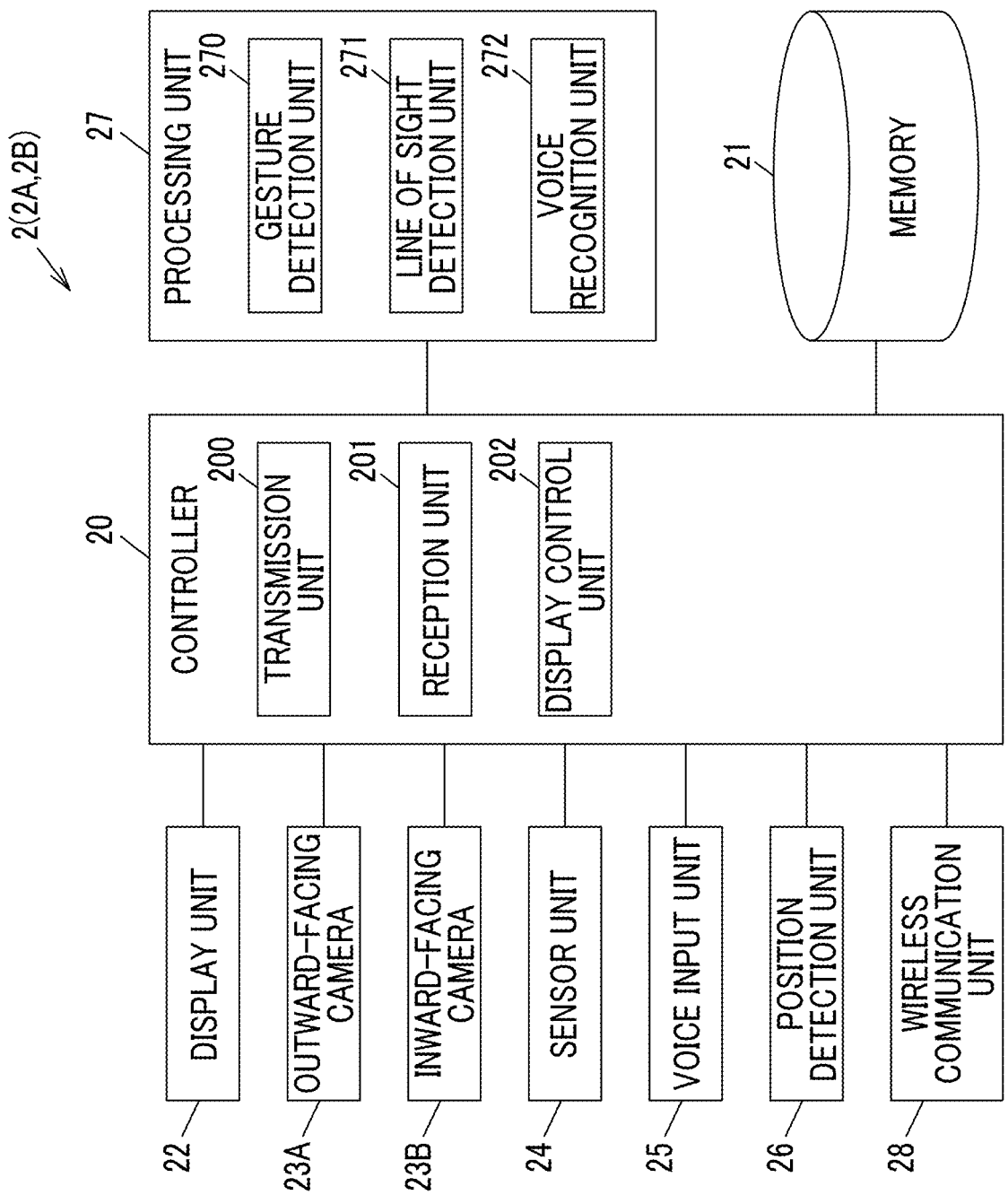
FIG. 2 is a diagram showing an example of a control system of the HMD device.

FIG. 2 is a diagram showing an example of a control system of the HMD device 2. The HMD device 2 includes a controller 20 that controls each unit of the HMD device 2, a memory 21 that stores various types of information, the display unit 22, the outward-facing camera 23A, an inward-facing camera 23B, a sensor unit 24, a voice input unit 25, a position detection unit 26, a processing unit 27, and a wireless communication unit 28.

The controller 20 includes a central processing unit (CPU), an interface, and the like. The CPU functions as a transmission unit 200, a reception unit 201, a display controller 202, and the like by operating in accordance with the program 210 stored in the memory 21. Details of each of the units 200 to 202 will be described later.

The memory 21 includes a read only memory (ROM), a random access memory (RAM), a hard disk, and the like, and stores programs, data, and the like.

The outward-facing camera 23A captures an outside scene including the face of a face-to-face person and the hand of the user, and sends the captured images to the controller 20. The inward-facing camera 23B captures the eyes of the user of the HMD device 2, and sends the captured image to the controller 20. The images captured by the outward-facing camera 23A and the inward-facing camera 23B may be a still image or a moving image. In the case of specifying the user by a face image, it may be a still image, but in the case of detecting a gesture by capturing the hand or the like of the user or detecting a gaze direction, for example, a moving image or continuous still images obtained by capturing plural images per second are preferred.

The sensor unit 24 includes a range image sensor, an acceleration sensor, and a gyro sensor. As the range image sensor, for example, an infrared range sensor, a laser range sensor, an ultrasonic range sensor, or the like can be used. The range image sensor emits infrared rays, laser, ultrasonic waves or the like, reads the distance for each pixel based on the time difference of the reflection and obtains a range image. The acceleration sensor detects the acceleration applied to the HMD device 2. The gyro sensor detects the angular velocity applied to the HMD device 2.

The voice input unit 25 includes a microphone, and converts the voice uttered by the user of the HMD device 2 into a voice signal which is an electric signal and inputs it.

The processing unit 27 processes information input from the outward-facing camera 23A, the inward-facing camera 23B, the sensor unit 24, and the voice input unit 25, and includes a gesture detection unit 270, a gaze detection unit 271, and a voice recognition unit 272.

The gesture detection unit 270 detects a gesture indicating the movement of the user. Specifically, the gesture detection unit 270 detects a predetermined gesture of the hand, based on the motion of the user's hand (for example, a pinch motion with two fingers), from the range image detected by the range image sensor of the sensor unit 24. Further, the gesture detection unit 270 detects the predetermined gesture of the head from the movement of the user's head (for example, shaking in the left and right direction), based on the acceleration of the HMD device 2 detected by the acceleration sensor of the sensor unit 24 and the angular velocity of the HMD device 2 detected by the gyro sensor. The gesture detection unit 270 transmits a command corresponding to the detected gesture to the controller 20.

The gaze detection unit 271 detects the user's gaze direction from the image obtained by the inward-facing camera 23B capturing the user's eyes, and transmits a command corresponding to the detected gaze direction to the controller 20. As a gaze detection technique, for example, the gaze direction may be detected based on the position of the iris relative to the inner corner position by using a visible light camera for the inward-facing camera 23B, and the gaze direction may be detected based on the position of the pupil with respect to the position of the corneal reflection by using an infrared camera and an infrared LED for the inward-facing camera 23B. Note that gaze direction may be used instead of a gesture.

The voice recognition unit 272 converts the voice signal input by the voice input unit 25 into digital voice data and transmits the voice data to the controller 20.

The wireless communication unit 28 communicates with the information processing apparatus 3 using, for example, a wireless LAN such as wireless fidelity (Wi-Fi), Wi-Fi direct, or short-range wireless communication such as Bluetooth (registered trademark), and infrared communication. It should be noted that the wireless communication unit 28 may communicate between the HMD devices 2.

The position detection unit 26 periodically detects the position information indicating the position of the HMD devices 2 using a global positioning system (GPS) or the like, and transmits the detected position information to the controller 20. It should be noted that the position of the HMD devices 2 may be detected using a beacon signal. That is, the position detection unit 26 detects a beacon signal including a beacon ID identifying a beacon transmitter, and transmits the beacon ID and the intensity information of the beacon signal to the information processing apparatus 3. The information processing apparatus 3 acquires the position information of the HMD device 2 from the information on the position of the beacon transmitter corresponding to the beacon ID and the intensity of the beacon signal.

Next, each of the units 200 to 202 of the HMD device 2 will be described.

The transmission unit 200 transmits to the information processing apparatus 3, the image captured by the outward-facing camera 23A, the processing results by the processing unit 27 (for example, the command corresponding to the gesture detected by the gesture detection unit 270, the gaze direction detected by the gaze detection unit 271 and the command corresponding to the gaze direction, or the voice data recognized by the voice recognition unit 272), or the position information detected by the position detection unit 26, together with the user ID for identifying the user of the HMD device 2, by the wireless communication unit 28.

The reception unit 201 receives the display image and the position information indicating the position to display the display image as a virtual image, which are transmitted from the transmission unit 304 of the information processing apparatus 3.

The display controller 202 controls the display unit 22, based on the display image and the position information received by the reception unit 201. That is, the display controller 202 controls so as to generate a display image for the right eye and a display image for the left eye, based on the display image and the position information received by the reception unit 201, display the display image for the right eye on the right transmissive display 221a, and display the display image for the left eye on the left transmissive display 221b so that the virtual image is viewed by the user of the HMD device 2 at the position corresponding to the position information.

Figure 3:
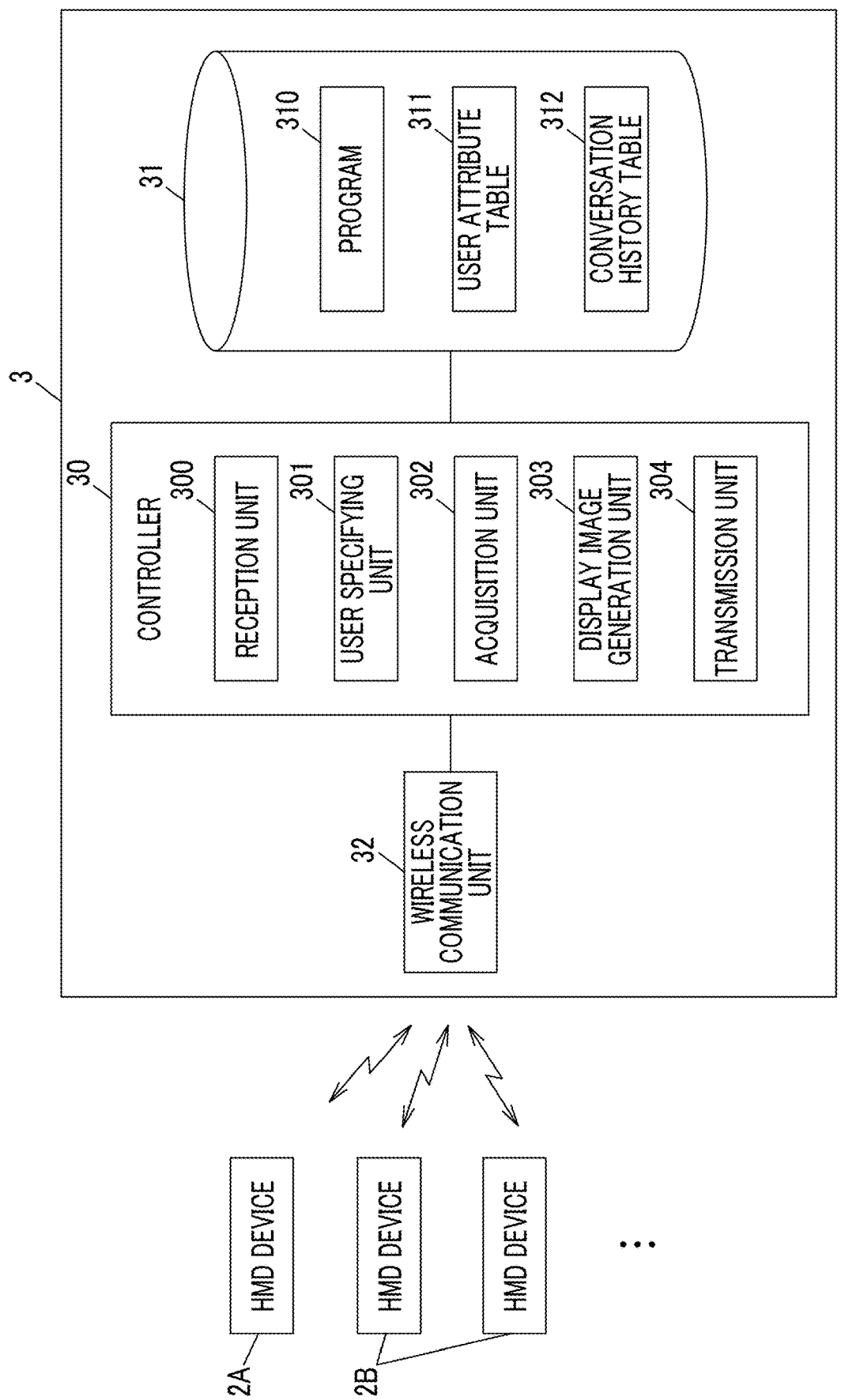
FIG. 3 is a block diagram showing an example of a control system of the information processing apparatus.

FIG. 3 is a block diagram showing an example of a control system of the information processing apparatus 3. The information processing apparatus 3 includes a controller 30 that controls each unit of the information processing apparatus 3, a memory 31 that stores various types of information, and a wireless communication unit 32 that performs wireless communication with each of the HMD devices 2.

The wireless communication unit 32 communicates with the HMD device 2 using, for example, a wireless LAN such as wireless fidelity (Wi-Fi), Wi-Fi direct, or short-range wireless communication such as Bluetooth (registered trademark), and infrared communication.

The controller 30 includes a central processing unit (CPU), an interface, and the like. The CPU functions as a reception unit 300, a user specifying unit 301, an acquisition unit 302, a display image generation unit 303, a transmission unit 304, and the like by operating in accordance with the program 310. Details of each of the units 300 to 304 will be described later. The display image generation unit 303 is an example of the generation unit. The transmission unit 304 is an example of an instruction unit.

The memory 31 includes a read only memory (ROM), a random access memory (RAM), a hard disk, and the like, and stores a program 310, a user attribute table 311 (see FIG. 4), a conversation history table 312 (see FIG. 5), and the like. The conversation history table 312 is an example of history information on the speeches that the participants to an event currently being performed make. In the present specification, in a case where information is written into a table, recording is used, and in a case where information is written into a memory, storage is used.

Configuration of User Attribute Table

FIG. 4 is a diagram showing an example of the user attribute table 311. User attribute information is recorded in advance in the user attribute table 311. The user attribute table 311 includes a "user ID" column in which a user ID is recorded, a "user name" column in which a user name is recorded, a "belonging department" column in which a department to which the user belongs is recorded, a "user type" column in which the type indicating whether the user is a regular employee, a temporary employee, a management position, or a general position is recorded, a "length of service" in which length of service is recorded, and a "face feature information" column in which face feature information extracted from the face image obtained by capturing the face of the user is recorded. "Face feature information" refers to information indicating features of a face such as the size, shape, position, and the like of each of the eyes, nose, mouth and the like that make up the face. In addition, the face feature information may include features of the jaw and neck. In a case where the HMD device 2 is worn on the head, it is difficult to extract the features of the eyes, so it becomes easier to identify the user by including the jaw and neck in the face feature information.

Configuration of Conversation History Table

FIG. 5 is a diagram showing an example of the conversation history table 312. The conversation history table 312 generated every time a conference is held. The conversation history table 312 is stored in the memory 31 in association with a conference ID for identifying a conference and a user ID for identifying a facilitator. The conversation history table 312 shown in FIG. 5 shows that the conference ID is "C001" and the facilitator's user ID is "user010".

The conversation history table 312 includes a "user ID" column in which a user ID for identifying a participant is recorded, a "speech timing" column in which the time a participant speaks is recorded, a "speech time" column in which a speech time is recorded, a "speech content" column in which the speech content spoken by the participant is recorded, and a "position information" column in which position information indicating the position of the HMD device 2B is recorded. The position information of the HMD device 2B is an example of position information of participants. For example, (x, y) indicating longitude and latitude is recorded as position information recorded in the "position information" column. The position information may be (x, y, z) indicating longitude, latitude, and altitude.

Next, each of the units 300 to 304 of the information processing apparatus 3 will be described.

The reception unit 300 receives the user ID, the face image, the voice data, the position information and various commands transmitted from the HMD device 2.

The user specifying unit 301 extracts face feature information from the face image transmitted from the HMD device 2, and collates the extracted face feature information with face feature information recorded in the "face feature information" column of the user attribute table 311 to specify the user ID corresponding to the face image. In addition, the user ID may be specified based on the voice feature information indicating the feature of the voice. In this case, the user's voice specifying information is recorded in the user attribute table 311 shown in FIG. 4 in advance.

In a case where the reception unit 300 receives the command indicating a request to display the number of speeches, the acquisition unit 302 acquires the user name and the number of speeches for each user ID from the conversation history table 312.

The display image generation unit 303 generates a display image to be displayed on the display unit 22 of the HMD device 2, for example, a display image including the user name and the number of speeches acquired by the acquisition unit 302. In addition, the display image generation unit 303 may calculate "the number of speeches x the speech time=speech amount for each user name", and generate a display image including the user name and the speech amount.

The transmission unit 304 instructs the HMD device 2 to display the generated display image as an image of the virtual space. Specifically, the transmission unit 304 transmits the display image generated by the display image generation unit 303 and the position information to display the display image as a virtual image, to the HMD device 2 (in the present exemplary embodiment, the HMD device 2A used by the facilitator). The position information to display the virtual image is, for example, the upper part of a partner (a participant in the present exemplary embodiment) calculated based on the coordinates recorded in the "position information" column of the conversation history table 312. In addition, the position information to display the virtual image is not limited to the upper part of the head of the partner but may be in the vicinity of the side of the partner or the like.

Operation of First Exemplary Embodiment

Next, an example of the operation of the information processing system 1 will be described with reference to FIG. 6 and the flowchart of FIG. 7.

(1) Specification of Participants

In a case where the facilitator moves his or her hand to perform a gesture instructing capturing of the participant's face (a first gesture), the gesture detection unit 270 of the HMD device 2A detects the first gesture from the range image acquired by the range image sensor of the sensor unit 24, and transmits a first command corresponding thereto, to the controller 20.

Each time the first command is transmitted from the gesture detection unit 270, the controller 20 controls the outward-facing camera 23A to capture photograph the face of the participant. The controller 20 acquires a face image obtained by capturing the participant by the outward-facing camera 23A.

The transmission unit 200 of the HMD device 2A transmits the face image to the information processing apparatus 3 together with the user ID for identifying the facilitator.

The reception unit 300 of the information processing apparatus 3 receives the face image and the user ID transmitted from the HMD device 2A (S1).

The user specifying unit 301 extracts face feature information from the face image received by the reception unit 300, and collates the extracted face feature information with face feature information recorded in the user attribute table 311 to specify the user ID of the participant who uses the HMD device 2B (S2). The user specifying unit 301 records the user ID in the "user ID" column of the conversation history table 312. Thus, the participant participating in the conference can be specified. Further, by storing the user ID of the facilitator in advance in the memory 31 of the information processing apparatus 3, it is possible to specify participants for each conference.

(2) Recording of Speech Contents

The reception unit 300 of the information processing apparatus 3 determines whether or not voice data has been received (S3).

In a case where the participants speak to each other, the voice input unit 25 of the HMD device 2B used by the participant converts the voice generated by the participant into a voice signal and inputs it. The voice recognition unit 272 converts the voice signal into voice data. The transmission unit 201 transmits the voice data to the information processing apparatus 3 together with the user ID and the position information indicating the position of the HMD device 2B.

In a case where the reception unit 300 of the information processing apparatus 3 receives the voice data, the user ID, and the position information (S3: Yes), a speech timing is recorded in the "speech timing" column, a speech time is recorded in the "speech time" column, the speech content which is voice data is recorded in the "speech content" column, and the position information is recorded in the "position information" column, corresponding to the user ID recorded in the "user ID" column of the conversation history table 312 (S4). FIG. 5 shows a case where "I think so too . . . " that a participant with a user ID "user001" speaks is recorded.

(3) Generation of Display Image

In a case where the facilitator moves his or her hand to perform a gesture indicating a request to display the number of speeches (a second gesture), the gesture detection unit 270 of the HMD device 2A detects the second gesture and transmits a second command corresponding thereto, to the controller 20. The transmission unit 200 transmits the second command together with the user ID of the facilitator to the information processing apparatus 3.

The reception unit 300 of the information processing apparatus 3 determines whether or not a second command indicating a request to display the number of speeches and a user ID have been received (S5). In a case where the reception unit 300 receives the second command and the user ID (S5: Yes), the acquisition unit 302 acquires the user name of the participant, the number of speeches and position information from the conversation history table 312 (S6). The number of speeches is obtained by counting the number of records of the user ID in the conversation history table 312.

The display image generation unit 303 generates a display image including the user name and the number of speeches acquired by the acquisition unit 302 (S7). The display image is a two-dimensional image including a user name and the number of speeches.

(4) Transmission of Display Image and Position Information

The transmission unit 304 transmits the display image and the position information generated by the display image generation unit 303 to the HMD device 2A used by the facilitator (S8).

The display controller 202 of the HMD device 2A controls the display unit 22 so as to display the display image as a virtual image on the upper part of the head of the participant, based on the display image and the position information.

Figure 6:
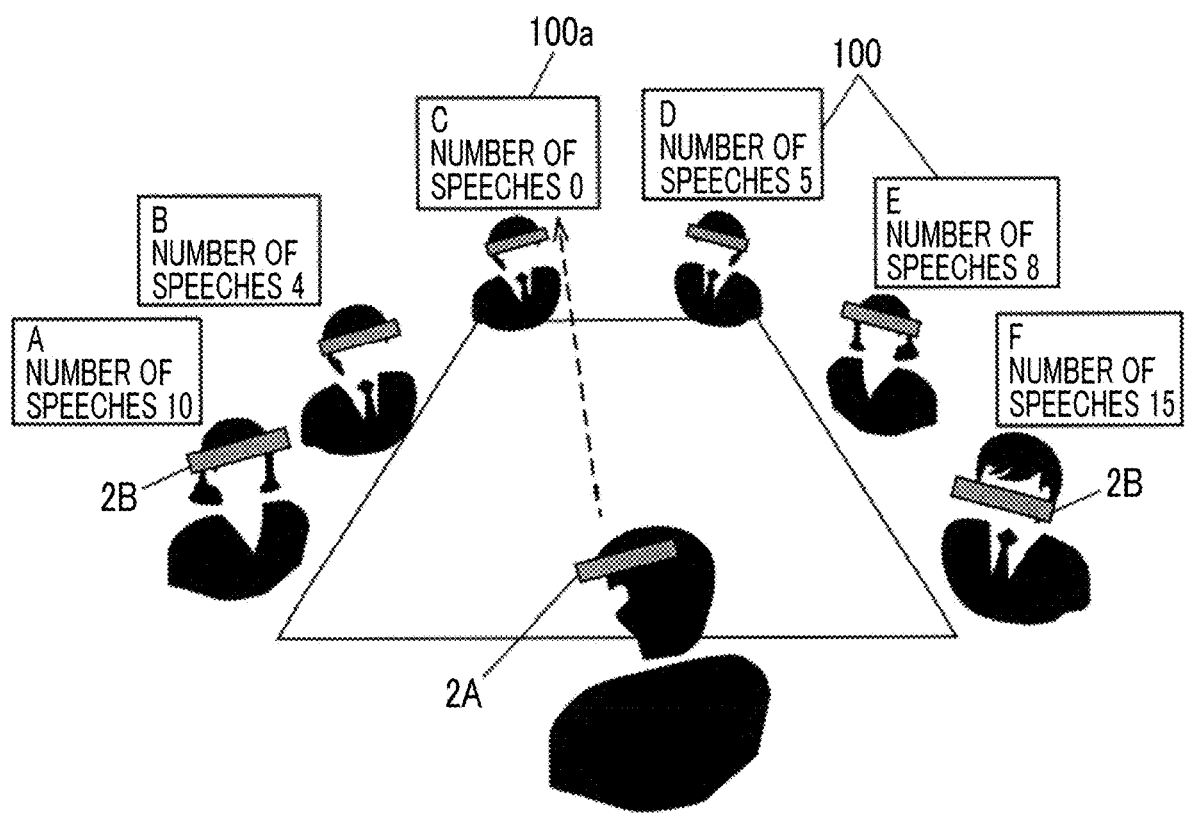
FIG. 6 is a diagram showing a display example of a virtual image.
Figure 7:
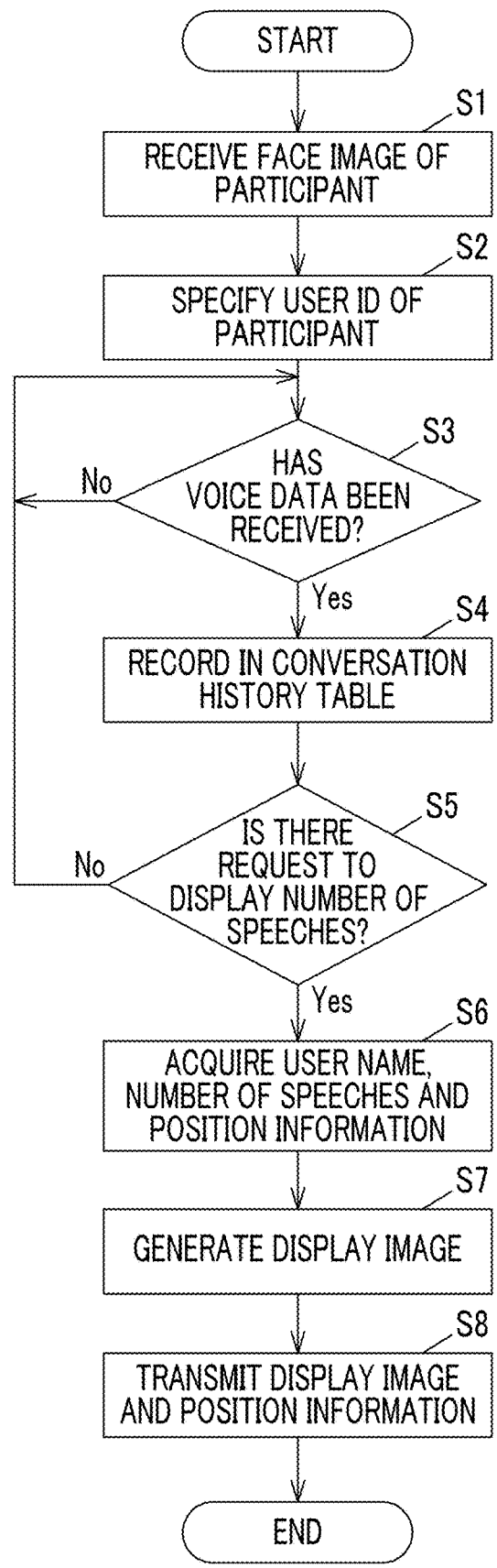
FIG. 7 is a flowchart showing an example of an operation of the information processing apparatus according to the first exemplary embodiment.

As shown in FIG. 6, the facilitator views the virtual image 100 including the user name and the number of speeches displayed on the upper part of the head of the participant. In this case, the virtual image 100a of the participant with the smallest number of speeches may be displayed in a different display manner, for example, in a different color from the other virtual images 100. Note that the display manner of the virtual image 100 of the participant whose the number of speeches is equal to or smaller than the threshold value may be different from that of the other virtual images 100. Further, the number of times the facilitator makes a nomination may be included in the display image. The number of nominations may be input to the voice input unit 25 of the HMD device 2A used by the facilitator and calculated based on the voice data recognized by the voice recognition unit.

In addition, in a case where there is no speech for a predetermined time, a virtual image of a different color from the others may be displayed.

Modification Example 1

Figure 8:
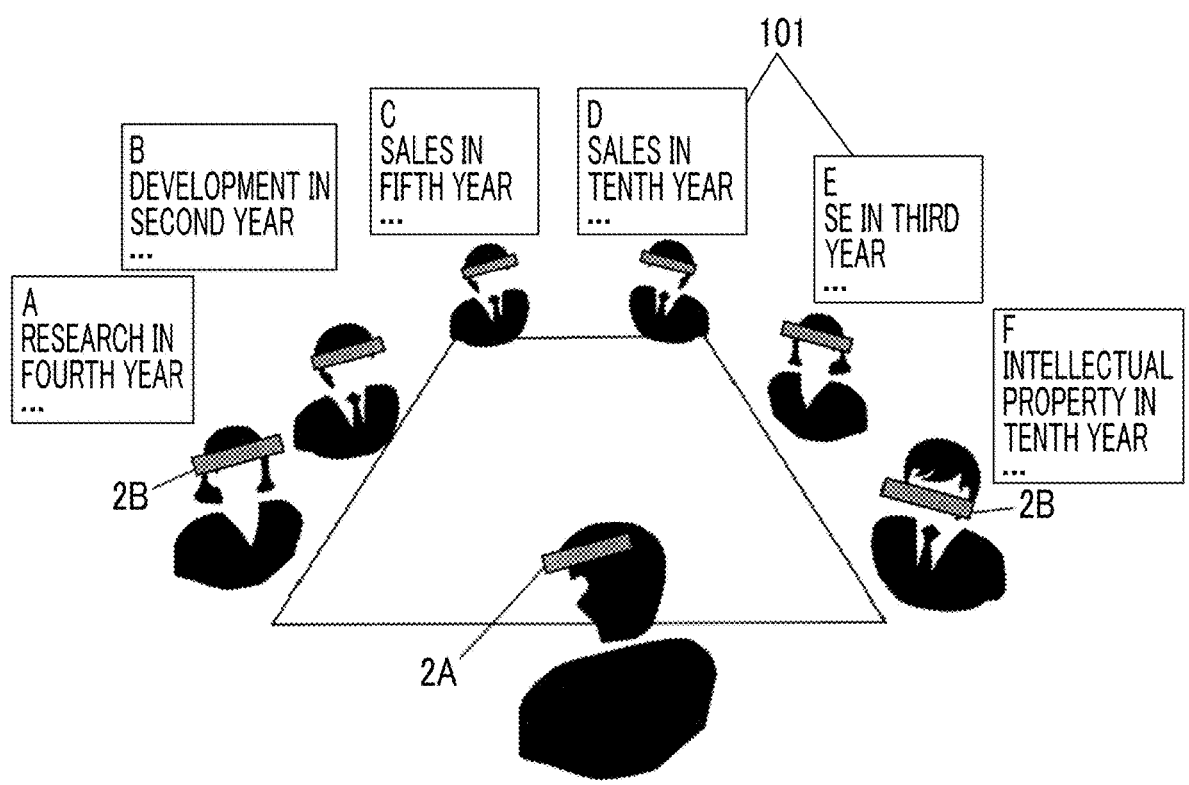
FIG. 8 is a diagram showing Modification Example 1 of the virtual image.

FIG. 8 is a diagram showing Modification Example 1 of the virtual image. In FIG. 6, the virtual image 100 including the user name and the number of speeches is viewed by the facilitator, but as shown in FIG. 8, the virtual image 101 including the attribute information of the participant may be viewed.

In a case where the facilitator moves the hand to perform a gesture indicating a request to display participant's attribute information (a third gesture), the gesture detection unit 270 of the HMD device 2A used by the facilitator detects the third gesture and transmits a third command corresponding thereto, to the controller 20. The transmission unit 200 transmits the third command and user ID to the information processing apparatus 3.

The reception unit 300 of the information processing apparatus 3 receives the third command and user ID. The acquisition unit 302 acquires from the user attribute table 311, the user name and the user's history information corresponding to the user ID received by the reception unit 300.

The display image generation unit 303 generates a display image including the user name and the user's attribute information acquired by the acquisition unit 302. The transmission unit 304 transmits the display image and the position information to the HMD device 2A.

The reception unit 201 of the HMD device 2A receives the display image and the position information, and the display controller 202 controls the display unit 22 so as to display the display image as a virtual image on the head of the participant. As shown in FIG. 8, the facilitator views the virtual image 101 including the user's attribute information displayed on the upper part of the head of the participant. The virtual image 101 shown in FIG. 8 includes, for example, the user name, the belonging department, and the length of service of the participant.

Modification Example 2

Figure 9:
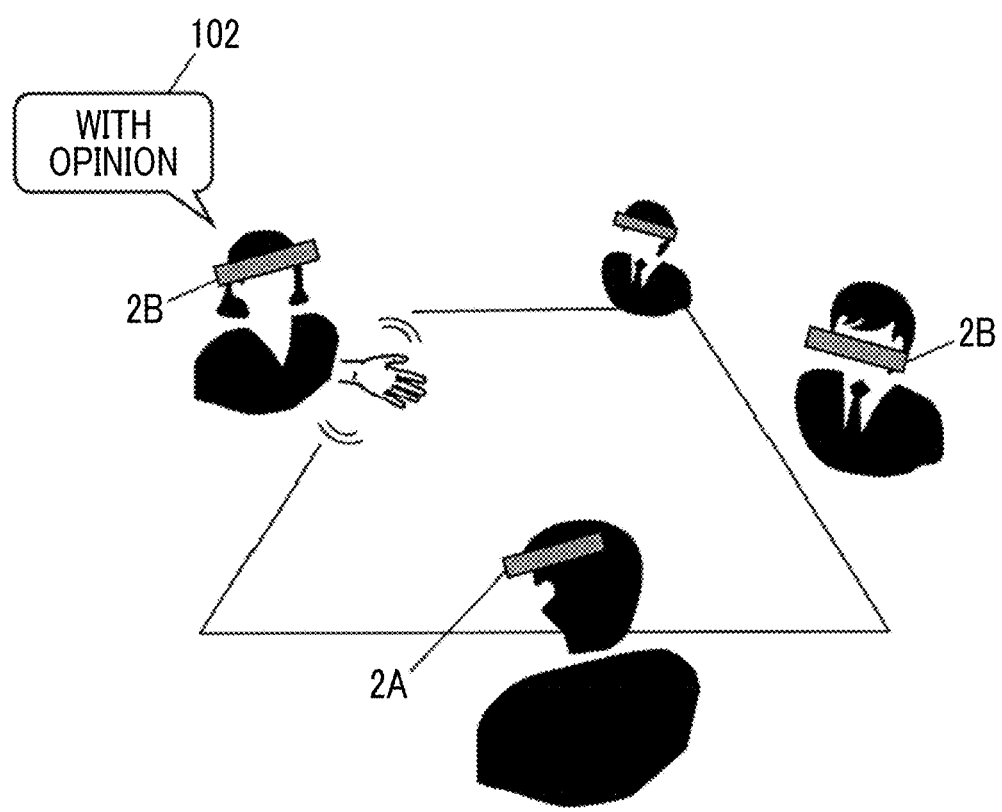
FIG. 9 is a diagram showing Modification Example 2 of the virtual image.

FIG. 9 is a diagram showing Modification Example 2 of the virtual image. Although the display contents are switched depending on the intention of the facilitator in Modification Example 1, the intention of the participant is displayed in Modification Example 2. In a case where the participant moves the hand to perform a gesture indicating that the participant wants to speak (a fourth gesture), the gesture detection unit 270 of the HMD device 2B used by the participant detects the fourth gesture and transmits a fourth command corresponding thereto, to the controller 20. The transmission unit 200 transmits the fourth command and the user ID to the information processing apparatus 3. The participant's intention is an example of internal information of a target person. The internal information means feelings, emotions such as mood and opinions, signs, intentions, or the like.

The reception unit 300 of the information processing apparatus 3 receives the fourth command and the user ID, and the display image generation unit 303 generates a display image including information indicating the participant wants to speak, corresponding to the fourth command received by the reception unit 300. The transmission unit 304 transmits the display image and the position information to the HMD device 2A.

The reception unit 201 of the HMD device 2A receives the display image and the position information. The display controller 202 controls the display unit 22 so as to display the display image as a virtual image on the upper part of the head of the participant. As shown in FIG. 9, the facilitator views the virtual image 102 including information indicating that the participant wants to speak (for example, "with opinion") displayed on the upper part of the head of the participant. Such a display is effective for participants who may speak in a case where they are nominated, although they do not have the courage to speak on their own.

Modification Example 3

Figure 10:
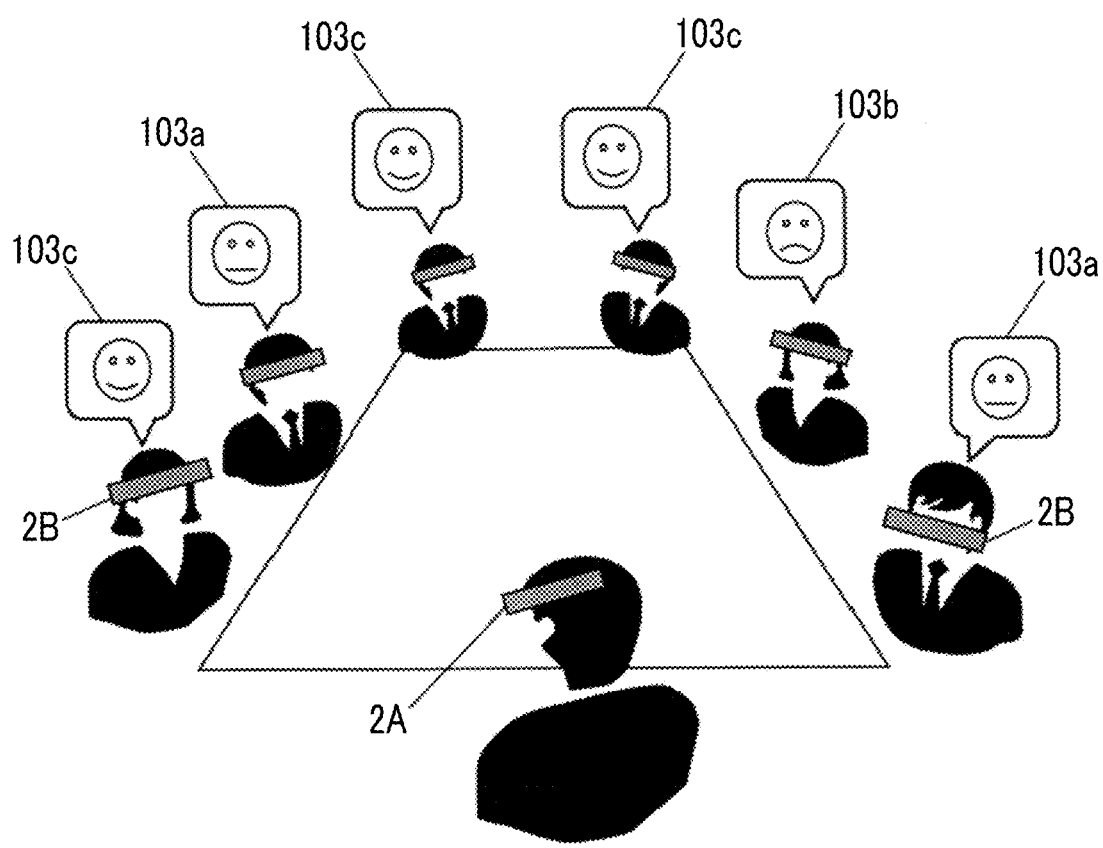
FIG. 10 is a diagram showing Modification Example 3 of the virtual image.

FIG. 10 is a diagram showing Modification Example 3 of the virtual image. In Modification Example 3, it is assumed that a face icon indicating the mood of a participant is displayed. In a case where the participant moves the hand to perform a gesture indicating a request to display the participant's mood (a fifth gesture), the gesture detection unit 270 of the HMD device 2B used by the participant detects the fifth gesture and transmits a fifth command corresponding thereto, to the controller 20. The transmission unit 200 transmits the fifth command and the user ID to the information processing apparatus 3. It is assumed that the fifth gesture has different behavior depending on the type of mood.

The reception unit 300 of the information processing apparatus 3 receives the fifth command and the user ID, and display image generation unit 303 generates a display image including a face icon corresponding to the type of the fifth command. The transmission unit 304 transmits the display image and the position information to the HMD device 2A.

The reception unit 201 of the HMD device 2A receives the display image and the position information. The display controller 202 controls the display unit 22 so as to display the display image as a virtual image on the upper part of the head of the participant. As shown in FIG. 10, the facilitator views the virtual images 103a to 103c each including the face icon displayed on the upper part of the head of the participant. In addition, opinions such as approval or opposition of participants may be displayed so as to be viewed as virtual images. It is effective in the case where the participant wants to reveal his or her mood and opinion only to the facilitator.

Modification Example 4

Figure 11A:
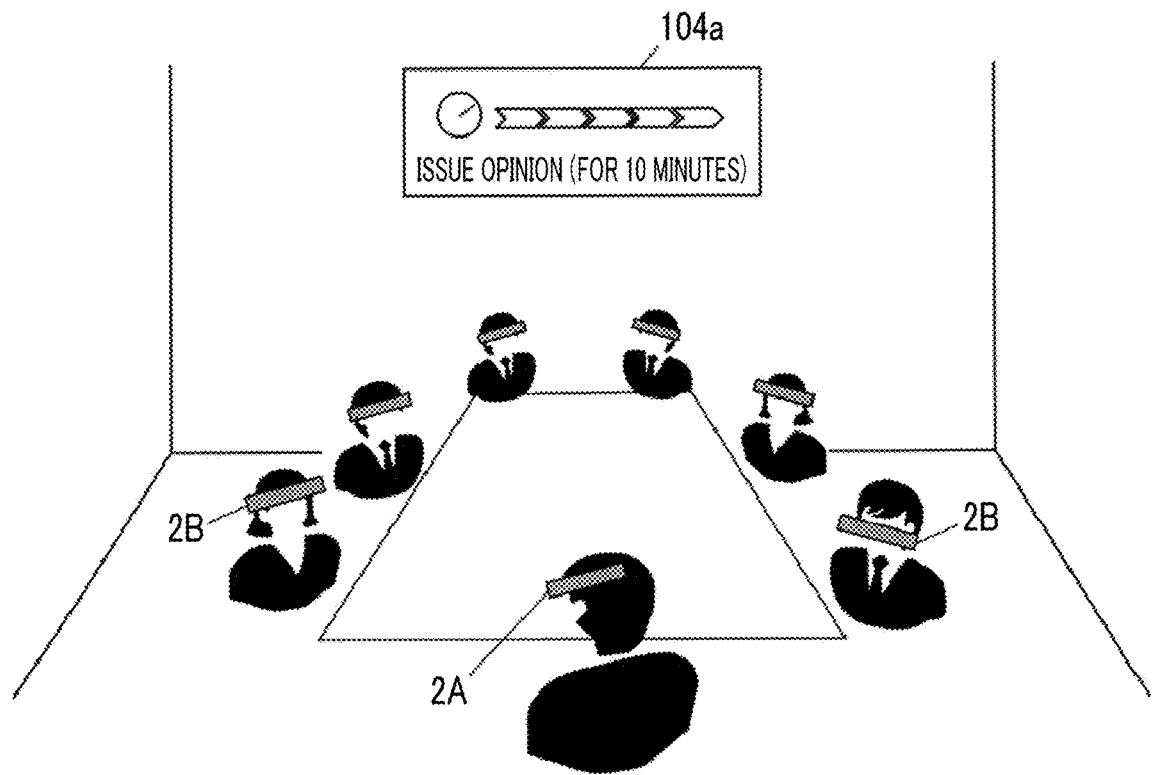
FIGS. 11A and 11B are diagrams showing Modification Example 4 of the virtual image.
Figure 11B:
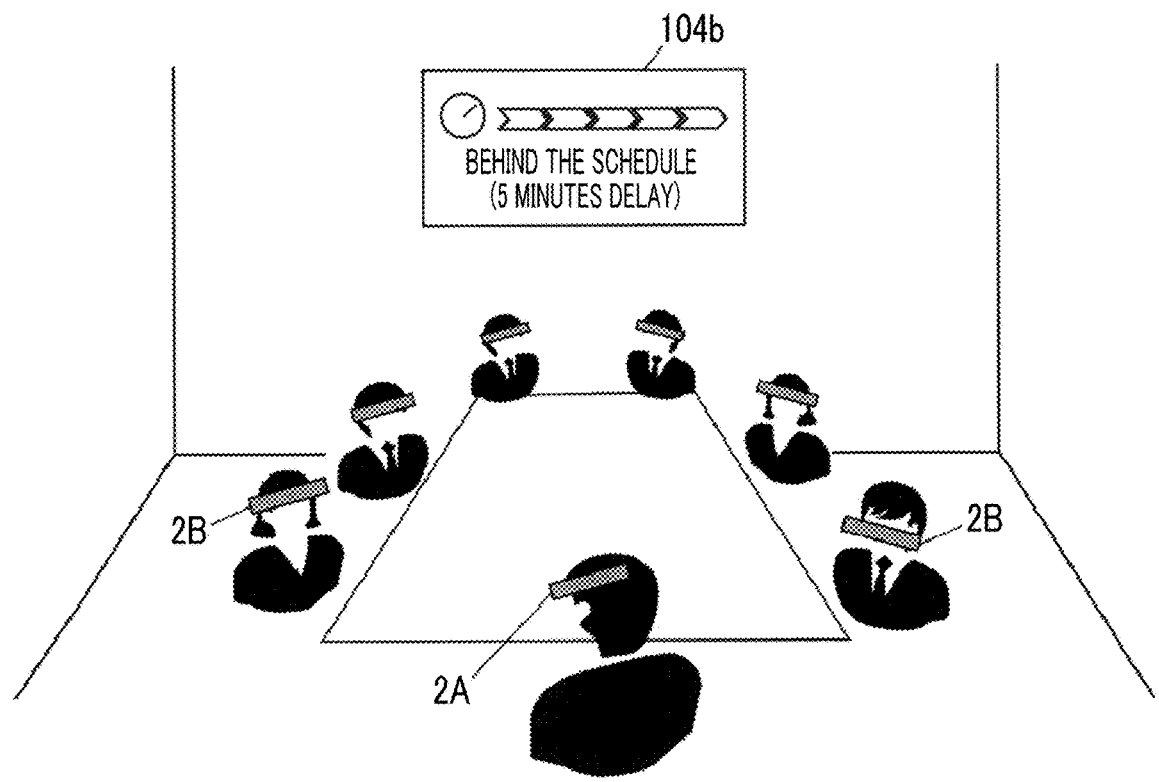

FIGS. 11A and 11B are diagrams showing Modification Example 4 of a virtual image. Modification Example 4 is for displaying the progress of the conference. In this case, conference schedule information (scheduled time for each of items constituting the conference) is stored in the memory 31. In a case where the facilitator moves his or her hand to perform a gesture indicating a request to display the progress of a conference (a sixth gesture), the gesture detection unit 270 of the HMD 2A used by the facilitator detects the sixth gesture and transmits a sixth command corresponding thereto, to the controller 20. The transmission unit 200 transmits the sixth command and the user ID to the information processing apparatus 3.

The reception unit 300 of the information processing apparatus 3 receives the sixth command and the user ID. The display image generation unit 303 reads conference schedule information from the memory 31 and generates a display image including the progress of the conference. The transmission unit 304 transmits the display image and the position information to the HMD device 2A. The position information of Modification Example 4 is not the position information of the HMD device 2 but the position information on the back wall of the predetermined conference room.

The reception unit 201 of the HMD 2A receives the display image and the position information. The display controller 202 controls the display unit 22 so that the display image is viewed as a virtual image on the wall behind the conference room. As shown in FIGS. 11A and 11B, the facilitator views virtual images 104a, 104b including the progress state of the conference displayed on the rear wall of the conference room. The virtual image 104a shown in FIG. 11A displays the items and the time of the conference to be currently performed. The virtual image 104b shown in FIG. 11B displays a fact that the conference is currently behind the schedule and the delayed time. In a case where the conference is ahead of the schedule, a fact that the conference is ahead of the schedule and the corresponding time may be displayed.

Second Exemplary Embodiment

Figure 12:
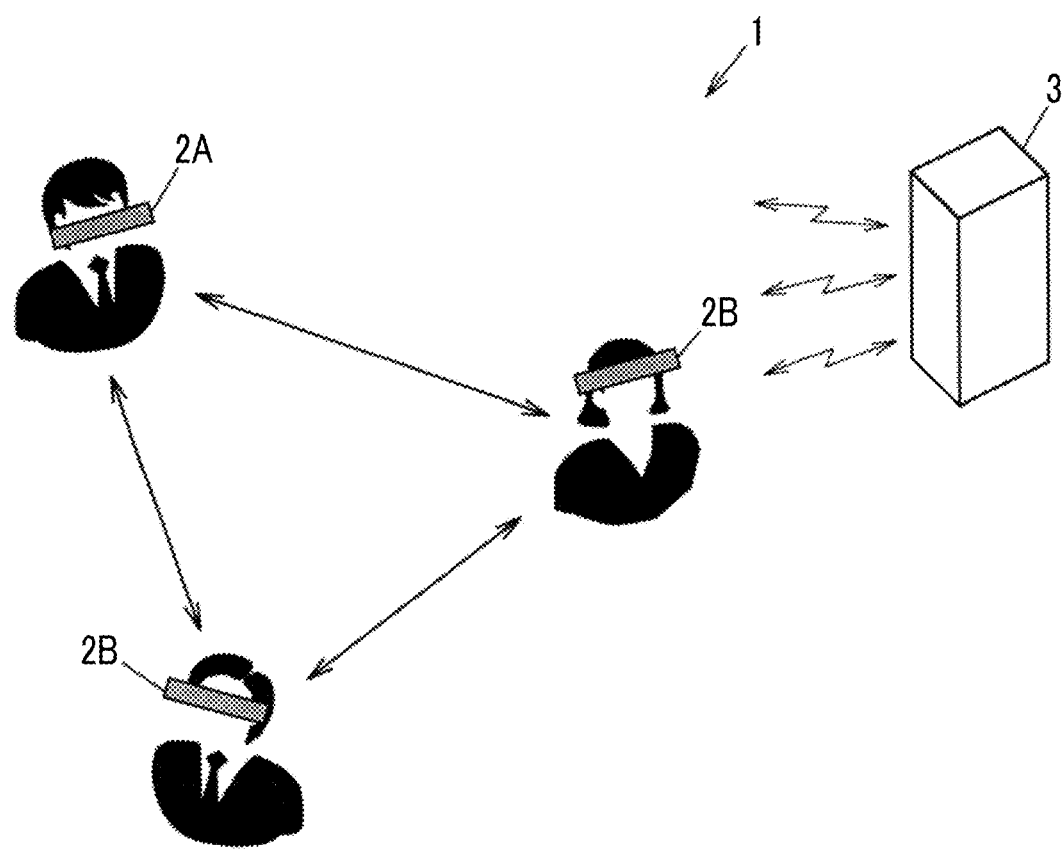
FIG. 12 is a diagram illustrating a configuration example of an information processing system according to a second exemplary embodiment of the present invention.

FIG. 12 is a diagram illustrating a configuration example of an information processing system according to a second exemplary embodiment of the present invention.

Similar to the first exemplary embodiment, the information processing system 1 includes an HMD device 2A used by a first person, an HMD device 2B used by a second person, and an information processing apparatus 3 that controls each of the HMD devices 2A, 2B. The HMD device 2 and the information processing apparatus 3 are connected to each other so as to communicate with each other wirelessly. Since the configuration of the HMD device 2 is the same as that of the first exemplary embodiment, its description is omitted.

In the case of the present exemplary embodiment, such an information processing system 1 can be used in, for example, an office, a public facility, a hospital, or the like. In the present exemplary embodiment, the first person and the second person are, for example, persons having relevance so that the similarity of the user satisfies the threshold value. For example, those who have relevance include those belonging to the same organization, or those belonging to different companies in a case where they have a cooperative relationship. "Organization" refers to a group of people including, for example, companies, organizations (departments, teams, groups, or the like) belonging to companies, association, or the like. The second person an example of a target person. The first person and the second person are also collectively referred to as users or users hereinafter.

Figure 13:
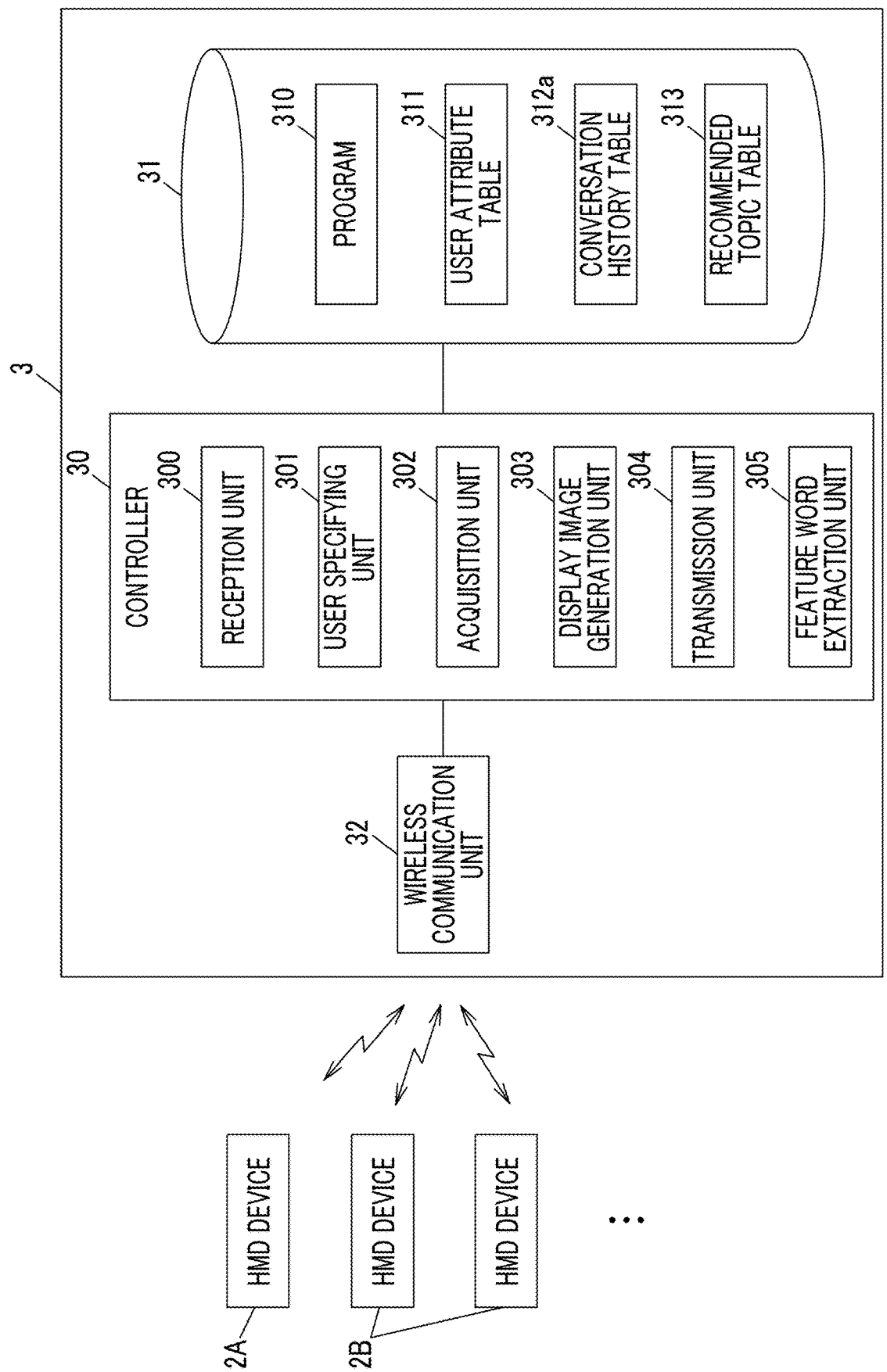
FIG. 13 is a block diagram illustrating an example of a control system of an information processing apparatus according to the second exemplary embodiment.

FIG. 13 is a block diagram showing an example of a control system of the information processing apparatus 3. The information processing apparatus 3 adds a feature word extraction unit 305 to the controller 30 of the information processing apparatus 3 shown in FIG. 3, and adds a recommended topic table 313 (see FIG. 15) to the memory 31. Hereinafter, a difference from the first exemplary embodiment will be mainly described.

The controller 30 includes a central processing unit (CPU), an interface, and the like. The CPU functions as a reception unit 300, a user specifying unit 301, an acquisition unit 302, a display image generation unit 303, a transmission unit 304, a feature word extraction unit 305, and the like by operating in accordance with the program 310. Details of each of the units 300 to 305 will be described later. The display image generation unit 303 is an example of the generation unit. The transmission unit 304 is an example of an instruction unit.

The memory 31 stores a program 310, a user attribute table 311 (see FIG. 4), a conversation history table 312a (see FIG. 14), a recommended topic table 313 (see FIG. 15), and the like. The conversation history table 312a is an example of history information on a conversation spoken by a target person.

Configuration of Conversation History Table

FIG. 14 is a diagram showing an example of the conversation history table. The conversation history table 312a includes a "conversation group ID" column in which a conversation group ID for identifying a group where a conversation is established is recorded, a "user ID" column in which a user ID for identifying a person who makes a conversation is recorded, a "speech timing" column in which the time a user speaks is recorded, a "speech time" column in which a speech time is recorded, a "speech content" column in which the speech content spoken by the person who makes a conversation is recorded, and a "position information" column in which position information indicating the position of the HMD device 2 is recorded. The position information of the HMD device 2 is an example of the position information of a first person or the position information of a second person.

Configuration of Recommended Topic Table

FIG. 15 is a diagram showing an example of a recommended topic table generated by being extracted from the conversation history table 312a shown in FIG. 14. The recommended topic table 313 has a "user name" column in which the user name is recorded and a "feature word" column in which the number of appearances of the feature word included in the conversation performed by the user is recorded. In the case shown in FIG. 15, "weather", "○ company project", "delivery time of □ work" and "patent of Δ" are included as feature words. Further, the case shown in FIG. 15 indicates that, for example, A in the user name uses "weather" once and "○ company project" five times, and does not use "delivery time of □ work" even once. "Feature word" is a word that characterizes the contents of a conversation, and refers to a word frequently occurring during the conversation. The greater the number of appearances, the feature number becomes a recommended topic. In a case where there are plural feature words with the greatest number of appearances, the user may select a feature word from among the plural feature words.

Next, each of the units 300 to 305 of the information processing apparatus 3 will be described.

Similar to the first exemplary embodiment, the reception unit 300 receives the user ID, the face image, the voice data, the position information and various commands transmitted from the HMD device 2.

The user specifying unit 301 extracts face feature information from the face image of the conversation partner transmitted from the HMD device 2, and collates the extracted face feature information with face feature information recorded in the "face feature information" column of the user attribute table 311 to specify the user ID of the partner of the conversation.

In a case where the reception unit 300 receives a command indicating a request to display information on the speech of the conversation partner, the acquisition unit 302 acquires the information on the partner from the user attribute table 311, the conversation history table 312, or the recommended topic table 313. The acquisition unit 302 may extract not only the feature word of the target person who is going to speak, but also extract a feature word from the content of conversation of a different target person having a relationship in which a similarity with respect to a personal attribute information to the user of the HMD device 2 and to the target person satisfies the threshold value. Thus, for example, in a case where the bosses A and B speak the contents of the conversation between B and C which are respective subordinates, A can view a virtual image, and information sharing is facilitated in the same organization.

The display image generation unit 303 generates a display image to be displayed on the display unit 22, for example, a display image including the feature word of a target person acquired by the acquisition unit 302. Further, the display image generation unit 303 may include the feature word as a recommended topic item in the display image, in a case where the number of appearances of a feature word is equal to or more than a predetermined number. For example, in a case where the predetermined number is set to three times, in the case shown in FIG. 15, as the feature words relating to B, "○ company case" and "delivery time of □ work" are included in the display image.

The transmission unit 304 transmits the display image generated by the display image generation unit 303 and the position information to display the display image as a virtual image to the HMD device 2. The position information to display the virtual image is, for example, the upper part of a partner calculated based on the coordinates recorded in the "position information" column of the conversation history table 312.

The feature word extraction unit 305 extracts the feature word from the conversation contents recorded in the "conversation content" column of the conversation history table 312a, and records it in the recommended topic table 313. In addition, the feature word extraction unit 305 may determine whether the HMD device 2 is in a conversation state based on the voice data transmitted from the HMD device 2, and extract a feature word from the voice data, in a case where it is determined that the HMD device 2 is in the conversation state.

The feature word extraction unit 305 may extract a feature word using a known feature extraction algorithm such as Term Frequency-Inverse Document Frequency (tf-idf). The tf-idf method is a method using the value of tf-idf for weighting the feature vector of a word in a vector space model or the like.

Each time a feature word is extracted, related conversations may be extracted from the conversation histories of other users by using collaborative filtering.

Feature words are extracted from the conversation, and the similarity between the extracted feature words is calculated. In a case where the similarity satisfies the threshold value, the feature words are recorded as the same feature word in the recommended topic table 313. The similarity may be obtained by, for example, a cosine similarity (inter-vector similarity), a Pearson correlation coefficient, or the like.

Figure 16:
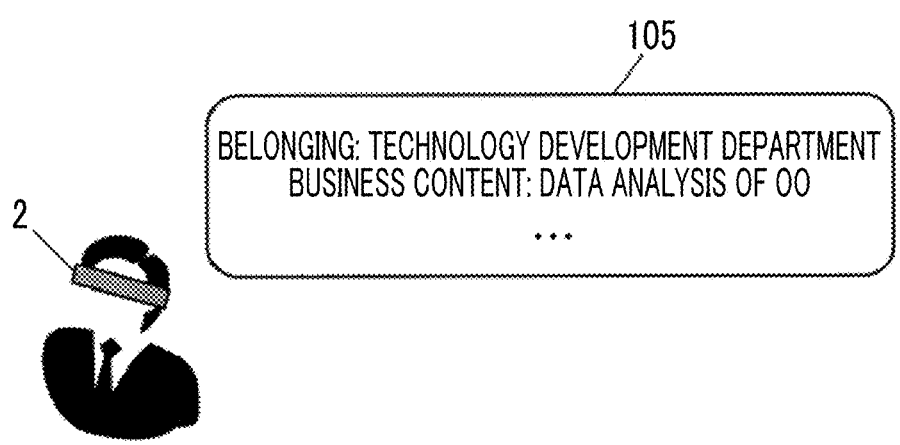
FIG. 16 is a diagram showing a display example of a virtual image.

FIG. 16 is a diagram showing a display example of a virtual image. As shown in FIG. 16, the display unit 22 may be controlled so as to acquire the attribute information of the partner from the user attribute table 311, and display a virtual image on the upper part of the head of the conversation partner. FIG. 16 shows a case where the belonging department and the work content are displayed.

Operation of Second Exemplary Embodiment

Figure 18:
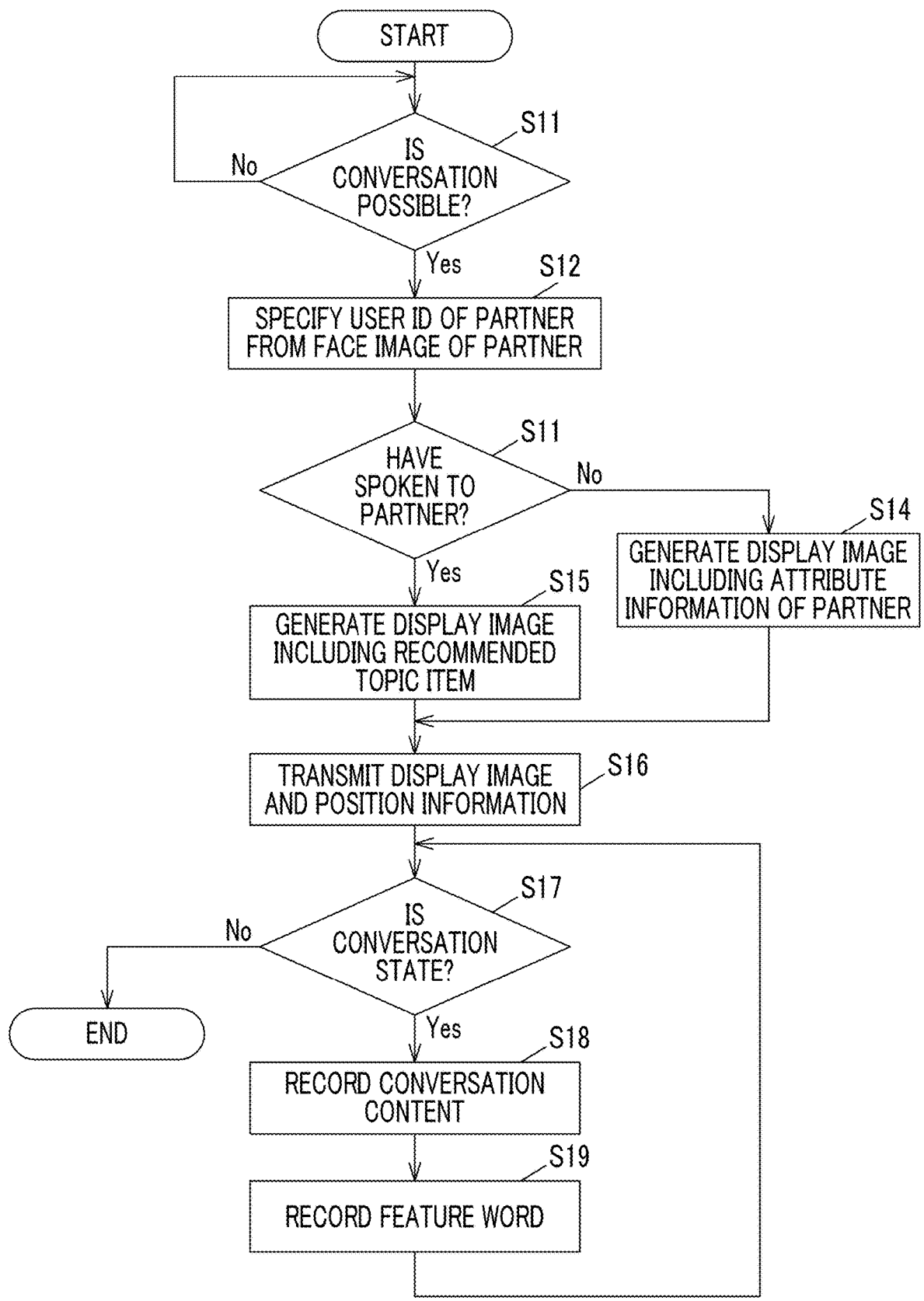
FIG. 18 is a flowchart showing an example of an operation of the information processing apparatus according to the second exemplary embodiment.

Next, an example of the operation of the information processing system 1 will be described with reference to FIG. 18. The case where the first person and the second person speak to each other will be described below.

(1) Specification of Persons Who Speak to Each Other

It is determined whether or not notification indicating that conversation is possible has been received from the HMD device 2A used by the first person and the HMD device 2B used by the second person (S11). Specifically, the controller 20 of the HMD device 2 determines whether the distance to the partner is within a predetermined distance (for example, 1 m) and whether the gaze is directed to the partner's face or not.

The distance to the partner is calculated from the range image detected by the range image sensor of the sensor unit 24 of the HMD device 2A. With respect to the gaze direction, the gaze direction detected by the gaze detection unit 271 of the HMD device 2A is calculated.

In a case where the controllers 20 of the HMD device 2A used by the first person and the HMD device 2B used by the second person determine that conversation is possible with partners, the controllers 20 notifies the information processing apparatus 3 that conversation is possible together with the user IDs.

The transmission unit 200 of the HMD device 2A used by the first person transmits the image captured by the outward-facing camera 23A together with the user ID for identifying the first person to the information processing apparatus 3 by the wireless communication unit 28. Similarly, the transmission unit 200 of the HMD device 2B used by the second person transmits the image captured by the outward-facing camera 23A together with the user ID for identifying the second person to the information processing apparatus 3 by the wireless communication unit 28.

Further, the transmission unit 200 of the HMD device 2 transmits the position information detected by the position detection unit 26 together with the user ID to the information processing apparatus 3.

In a case where the reception unit 300 of the information processing apparatus 3 receives from the HMD device 2A and the HMD device 2B, a fact that conversation is possible with partners and the face image together with the user IDs (S11: Yes), the user specifying unit 301 extracts face feature information from the face image transmitted from the HMD device 2A, and collates the extracted face feature information with the face feature information recorded in the "face feature information" column of the user attribute table 311 to specify the user ID of the second person. Similarly to this, the user specifying unit 301 extracts face feature information from the face image transmitted from the HMD device 2B, and collates the extracted face feature information with face feature information recorded in the "face feature information" column of the user attribute table 311 to specify the user ID of the first person.

The user specifying unit 301 determines that the first person and the second person of the specified user IDs form a conversation group, and issues a conversation group ID. Subsequently, as shown in FIG. 14, the user specifying unit 301 records the conversation group ID (for example, G001) in the "conversation group ID" column of the conversation history table 312a, records the user ID (for example, user001) of the first person and the user ID (for example, user002) of the second person in the "user ID" column, and records the position information (for example, ($x_1$, $y_1$), ($x_2$, $y_2$)) in the "position information" column.

(2) Generation of Display Image and Transmission of Display Image and Position Information With reference to the conversation history table 312a, the acquisition unit 302 determines whether or not the first person and the second person have spoken to each other (S13).

In a case where it is determined that they have not spoken to each other (S13: No), the acquisition unit 302 reads the attribute information of the first person and the second person from the user attribute table 311. The display image generation unit 303 generates the first display image including the attribute information of the second person, and generates the second display image including the attribute information of the first person (S14).

The transmission unit 304 transmits the first display image and the position information of the HMD device 2B used by the second person to the HMD device 2A used by the first person, and transmits the second display image and the position information of the HMD device 2A used by the first person to the HMD device 2B used by the second person (S16).

The display controller 202 of the HMD device 2A controls the display unit 22 so as to display the first display image as a virtual image on the upper part of the head of the second person. The display controller 202 of the HMD device 2B controls the display unit 22 so as to display the second display image as a virtual image on the upper part of the head of the first person.

As shown in FIG. 16, the virtual image 105 including the attribute information of the partner (the second person) on the upper part of the head of the partner (the second person) is viewed by the first person, and the virtual image 105 including the attribute information of the partner (the first person) on the upper part of the head of the partner (the first person) is viewed by the second person.

In a case where it is determined that they have spoken to each other in step S13 (S13: Yes), the acquisition unit 302 reads the item of the recommended topic from the recommended topic table 313. The display image generation unit 303 generates the first display image including the topic item recommended for the second person, and generates the second display image including the topic item recommended for the first person (S15).

The transmission unit 304 transmits the first display image and the position information of the HMD device 2B used by the second person to the HMD device 2A used by the first person, and transmits the second display image and the position information of the HMD device 2A used by the first person to the HMD device 23 used by the second person (S16).

The display controller 202 of the HMD device 2A controls the display unit 22 so as to display the first display image as a virtual image on the upper part of the head of the second person. The display controller 202 of the HMD device 2B controls the display unit 22 so as to display the second display image as a virtual image on the upper part of the head of the first person.

Figure 17:
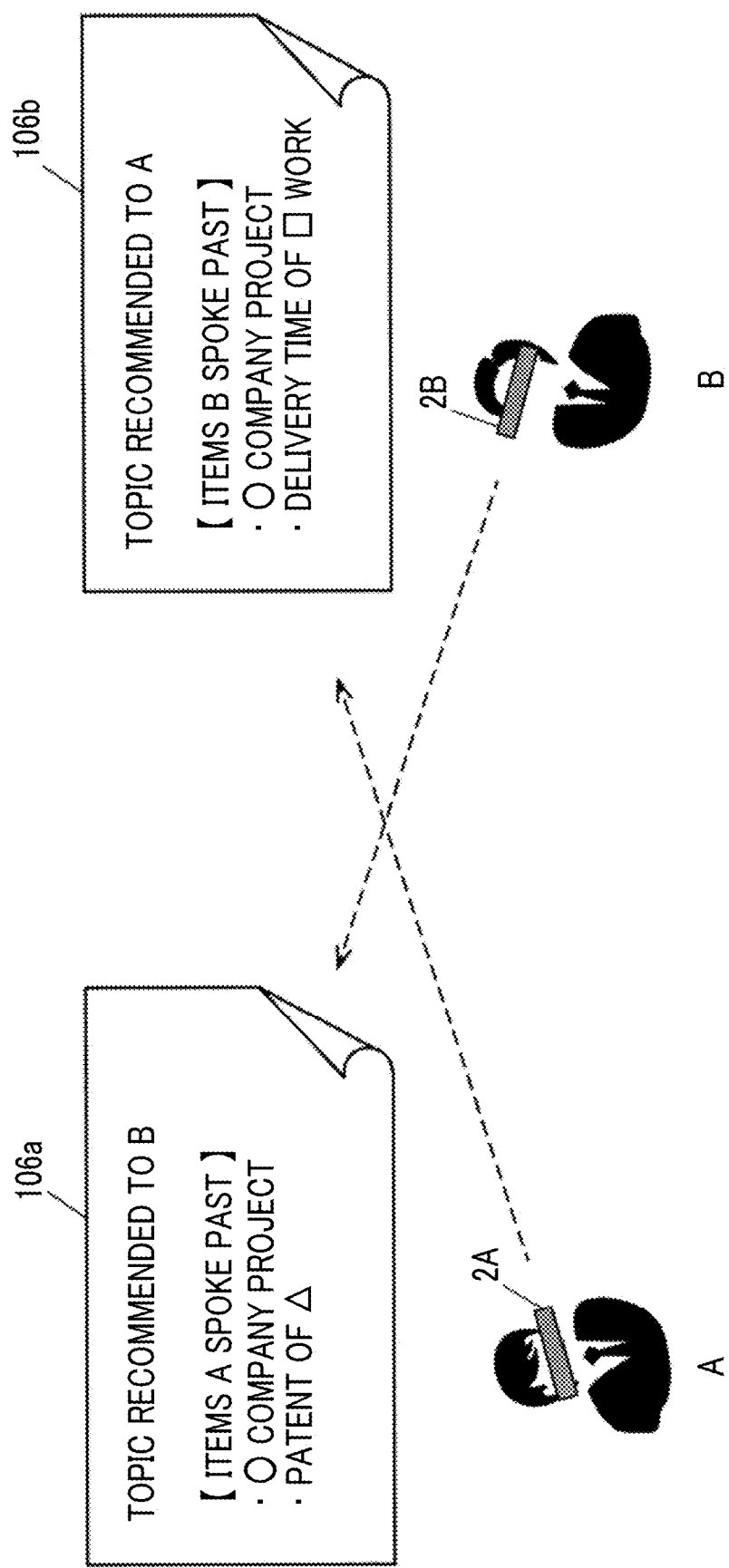
FIG. 17 is a diagram showing a display example of a virtual image.

As shown in FIG. 17, A who is the first person views a virtual image 106b including topic items recommended to A on the upper part of the head of B; and B who is the second person views a virtual image 106a including topic items recommended to B on the upper part of the head of A. In addition, for example, memo contents may be displayed as a virtual image together with or separately from the recommended topic items, as the scheduled conversation information. The portions where the memo content for the scheduled conversation and the conversation matches or does not match may be displayed in different colors. This makes it possible to prevent forgetting or misunderstanding. Further, his or her own health state or a free time zone may be displayed with a face icon or the like on his or her head or the like as a virtual image. Further, similarity between business contents and similarity of common interests may be calculated in advance, and information on common interests of participants may be displayed as a recommended topic.

(3) Recording Contents of Conversation

The reception unit 300 of the information processing apparatus 3 determines whether or not the HMD device 2 is in the conversation state. Specifically, the reception unit 300 determines whether or not the voice data of the conversation has been received based on the acoustic noise (S17).

In a case where the first person or the second person speaks (S17: Yes), the voice input unit 25 of the HMD device 2A or 2B used by the first person or the second person converts the voice generated by the first person or the second person into a voice signal and input it. The voice recognition unit 272 converts the voice signal into voice data. The transmission unit 201 transmits the voice data to the information processing apparatus 3 together with the user ID and the position information indicating the position of the HMD device 2.

In a case where the reception unit 300 receives the voice data, the user ID and the position information (S17: Yes), corresponding to the user ID recorded in the "user ID" column of the conversation history table 312a, a speech timing is recorded in the "speech timing" column, a speech time is recorded in the "speech time" column, the speech content which is voice data is recorded in the "speech content" column, and the position information is recorded in the "position information" column (S18).

The feature word extraction unit 305 extracts the feature word from the conversation contents newly recorded in the "conversation content" column of the conversation history table 312a, and records it in the recommended topic table 313 (S19). While the conversation state is continuing (S17: Yes), steps S18 and S19 are repeated.

In a case where the reception unit 300 has not received voice data for a predetermined time (for example, 30 seconds), it is determined that the HMD device 2 is not in the conversation state (S17: No), and the process is terminated.

MODIFICATION EXAMPLES

Figure 19A:
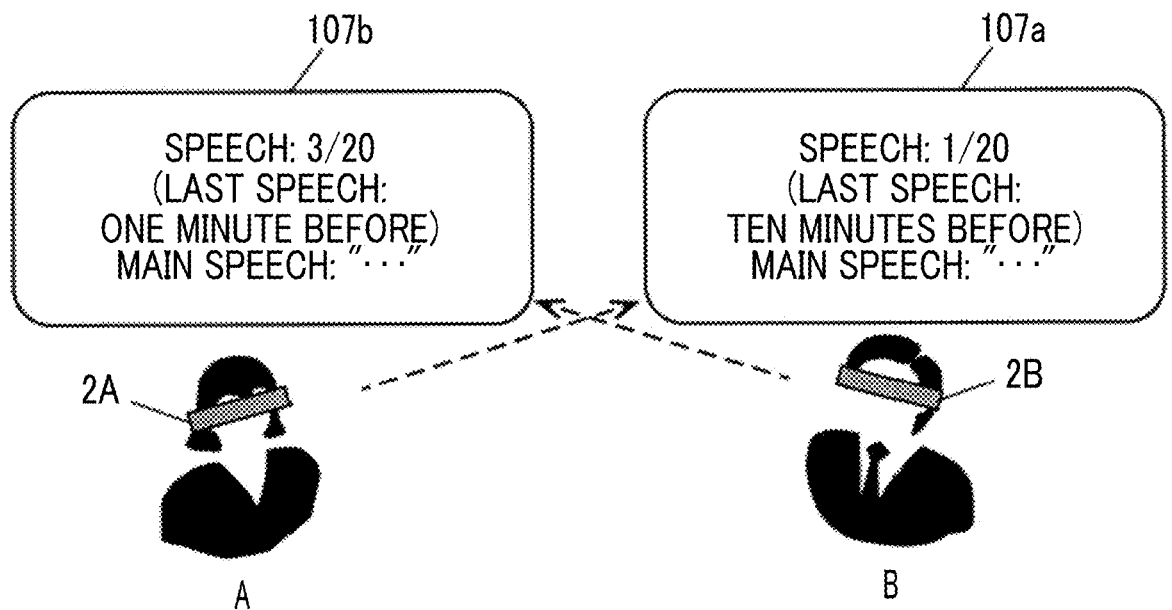
FIGS. 19A and 19B are diagrams showing modification examples of the virtual image.
Figure 19B:
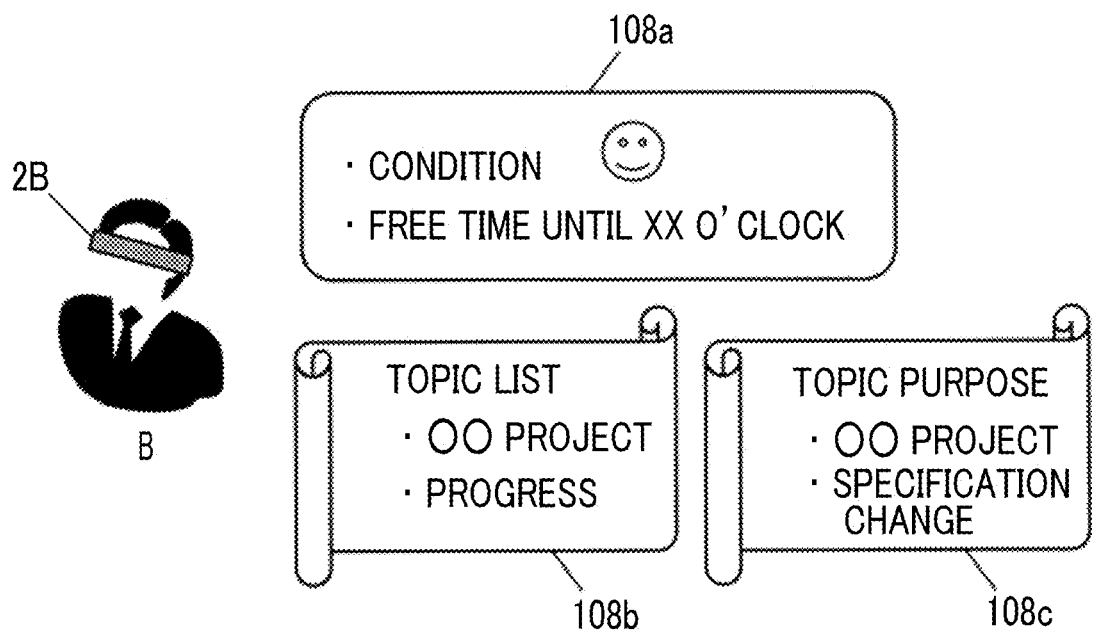

FIGS. 19A and 19B are diagrams showing a modification example of the virtual image. For example, as shown in FIG. 19A, A may view a virtual image 107a including the speech date and time, the last speech time, and the summary of the speech content as conversation history information on B, and B may view a virtual image 107b including the speech date and time, the last speech time, and the summary of the speech content as conversation history information on A.

Further, as shown in FIG. 19B, A may view as information on B, a virtual image 108a including a face icon indicating a physical condition and a free time, a virtual image 108b including a topic list, a virtual image 108c including topic purpose.

Although the exemplary embodiments of the present invention have been described above, the exemplary embodiments of the present invention are not limited to the above exemplary embodiments, and various modifications and implementations are possible within the scope not changing the gist of the present invention. For example, in each exemplary embodiment, the head mounted display device of a light transmission type has been described as a display device. However, the present invention can be similarly applied to a portable information terminal such as a smartphone that displays a display image as a virtual image so as to be superimposed on an image obtained by capturing a real space (outside scene).

Further, a part of the functions of the information processing apparatus 3 may be transferred to the HMD device 2, and a part of the functions of the HMD device 2 may be transferred to the information processing apparatus 3. For example, the voice recognition function of the HMD device 2 may be transferred to the information processing apparatus 3, the voice signal is transmitted from the HMD device 2 to the information processing apparatus 3, the voice signal may be converted into voice data by the voice recognition function of the information processing apparatus 3.

In each of the above-described exemplary embodiments, the position of the virtual image is set to the upper part of the target person. However, in a case where it can be determined that the target person is speaking standing based on the value of the acceleration by the acceleration sensor in the conversation state (for example, the value of the acceleration in which the lateral movement is greater than the vertical movement), the virtual image may be displayed on the wall on the back of the target person. Further, in a case where it can be determined that the target person is sitting based on the acceleration sensor in the conversation state, the position of the virtual image may be on the desk closest to the target person. Further, the user of the HMD device may indicate the position to display the virtual image by the gesture.

Parts or all of the units the controllers 20, 30 may be configured with hardware circuits such as a field programmable gate array (FPGA) and an application specific integrated circuit (ASIC).

Further, it is possible to omit or modify a part of the constituent elements of the above exemplary embodiments within the scope not changing the gist of the present invention. In the above exemplary embodiment, a description is given about a conversation spoken by the target person, but the conversation may be replaced with the action of the target person. For example, the history information may include the action of the target person. For example, a case where an event participant raises the hand with speech or a case where an event participant raises the hand without speech is recorded in a table as the history of the action of the target person. The actions of the target person are not only raising hand, but also gestures such as shaking the head, tilting the head, which target person the face or the gaze is directed, sitting in the seat, standing up from the seat, and waving the hands. In addition, for the action, as in FIG. 5, a user ID, an action timing, an action time, and an action content may be recorded as a table. For example, as a table similar to FIG. 5, user002 is stored for the user ID, 2017/5/14 is stored for the action timing, "three seconds" is stored for the action time and information that the face is directed to user001 is stored for the action content. Further, in the case where the scheduled conversation is replaced with the scheduled action, an example of the scheduled action is such that A sits in the seat by a predetermined time or B stands up at the predetermined time. In addition, in a case where the speech amount is replaced with the action amount, the number of actions x the action time=the action amount. In the generation of the display screen, a display image including a user name and an action amount may be generated. For example, similar to FIG. 6, the facilitator may view the virtual image including the user name and the number of raising hands displayed on the head of the participant. In the same way as above, the parts where the conversation spoken by the target person is described can be replaced with the action of the target person.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:
    generate a display image including information of a target person, based on history information that includes conversation or action made by the target person, wherein the conversation or the action in the history information includes conversation or action of the target person with another person that are different from a user viewing the generated display image; and
    instruct a display device to display the generated display image which superimposes in a space with the target person,
    wherein the generated display image includes a feature word extracted from the conversation or the action in the history information, and
    wherein the generated display image further includes information on a different target person in which predetermined attribute information of the different target person and predetermined attribute information of the target person indicate a cooperative relationship.

2. The information processing apparatus according to claim 1,
    wherein the history information is history information that a participant to an event currently being performed has made speech or action, and
    wherein the generated display image includes information on the speech or action of the participant.

3. The information processing apparatus according to claim 2,
    wherein the information on the speech is a speech amount obtained based on the number of speeches or a speech time.

4. The information processing apparatus according to claim 3,
    wherein the generated display image includes internal information of the target person.

5. The information processing apparatus according to claim 2,
    wherein the information on the action is an action amount obtained based on the number of actions or an action time.

6. The information processing apparatus according to claim 5,
    wherein the generated display image includes internal information of the target person.

7. The information processing apparatus according to claim 2,
wherein the generated display image includes internal information of the target person.

8. The information processing apparatus according to claim 1,
wherein the generated display image includes progress information indicating the progress of the event.

9. The information processing apparatus according to claim 1,
wherein the generated display image includes the feature word as a topic item to be recommended, in a case where a number of appearances of the feature word is equal to or more than a predetermined number.

10. The information processing apparatus according to claim 9,
wherein the generated display image includes information on a scheduled conversation or action.

11. The information processing apparatus according to claim 1,
wherein the generated display image includes internal information of the target person.

12. The information processing apparatus of claim 1, wherein the processor determines a historical conversation, between the target person and the different target person, that is relevant to the extracted feature word and relevant to the user viewing the display image.

13. An information processing apparatus comprising a processor configured to:
record a face feature information and conversation history associated with each of a plurality of users;
acquire, from a display device, a captured image that captures surrounding of the display device, and identification information of a user who uses the display device;
identify, from the captured image, a person in the captured image using the face feature information;
extract conversation history of the identified person from a stored conversation history, wherein the conversation history of the identified person includes the conversation history of the identified person with another person who is different from the user who uses the display device;
extract frequently appeared words according to a number of appearances of words in the extracted conversation history; and
determine information to be displayed on the display device based on the frequently appeared words.

14. The information processing apparatus according to claim 13, wherein
the display device has an image capturing function and a display function, and the display device is configured to:
transmit the captured image and the identification information of the user who uses the display device to the image processing apparatus;
receive the information to be displayed from the information processing apparatus; and
display the information to be displayed on the display device, and
the information processing apparatus comprising the processor that is further configured to:
transmit the information to be displayed to the display device.

\* \* \* \* \*